No. 739,545. PATENTED SEPT. 22, 1903.
C. H. HEATH.
VARIABLE SPEED GEARING.
APPLICATION FILED DEC. 8, 1902.
NO MODEL. 2 SHEETS—SHEET 1.

Witnesses C. H. HEATH, Inventor

By C. A. Snow & Co.
Attorneys

No. 739,545. PATENTED SEPT. 22, 1903.
C. H. HEATH.
VARIABLE SPEED GEARING.
APPLICATION FILED DEC. 8, 1902.
NO MODEL. 2 SHEETS—SHEET 2.
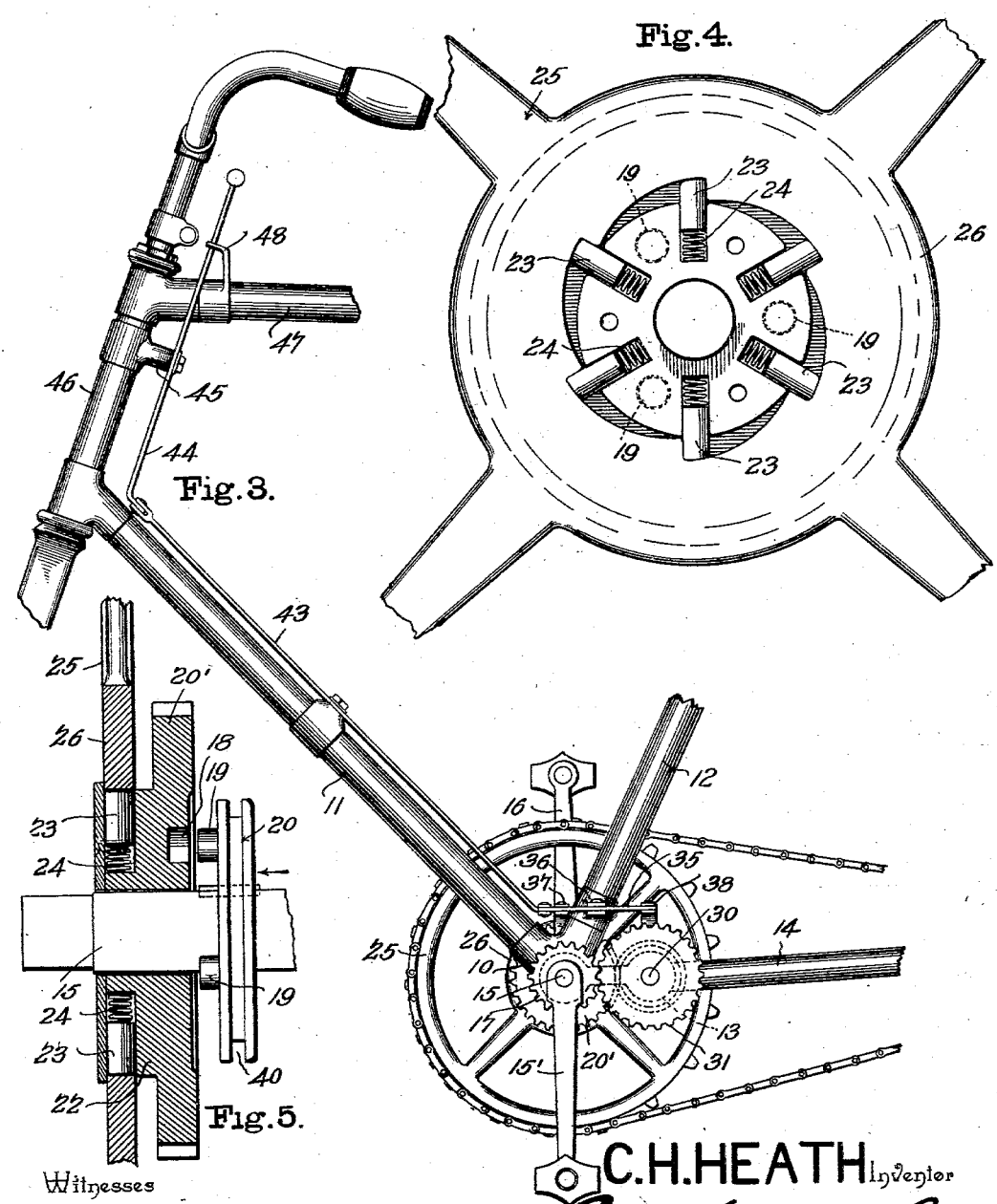

No. 739,545. Patented September 22, 1903.

UNITED STATES PATENT OFFICE.

CHARLES H. HEATH, OF FRANKLIN FALLS, NEW HAMPSHIRE.

VARIABLE-SPEED GEARING.

SPECIFICATION forming part of Letters Patent No. 739,545, dated September 22, 1903.

Application filed December 8, 1902. Serial No. 134,435. (No model.)

*To all whom it may concern:*

Be it known that I, CHARLES H. HEATH, a citizen of the United States, residing at Franklin Falls, in the county of Merrimack and State of New Hampshire, have invented a new and useful Variable-Speed Gearing, of which the following is a specification.

This invention relates to variable-speed gearings, and more particularly to that class particularly applicable to bicycles; and it has for its object to provide a device of this nature wherein by operation of suitable clutch mechanism the speed of the bicycle may be changed and in which, furthermore, the sprocket may rotate forwardly independently of the drive-shaft to permit of coasting.

Additional objects and advantages of the invention relate to the details of construction and will be evident from the following description.

Figure 1:
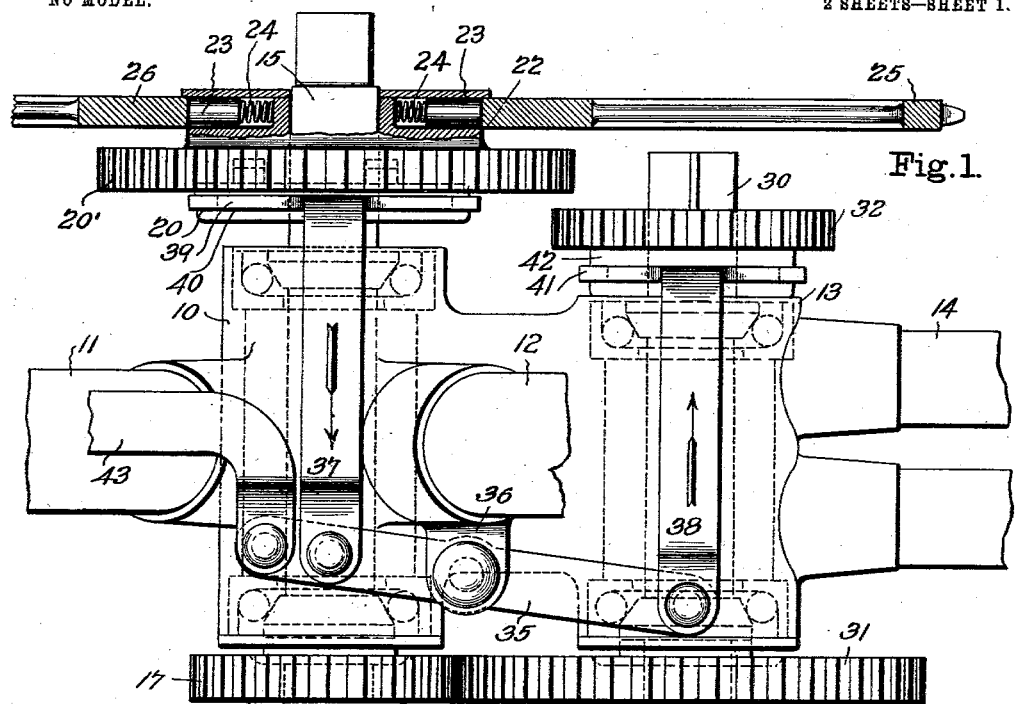
Figure 2:
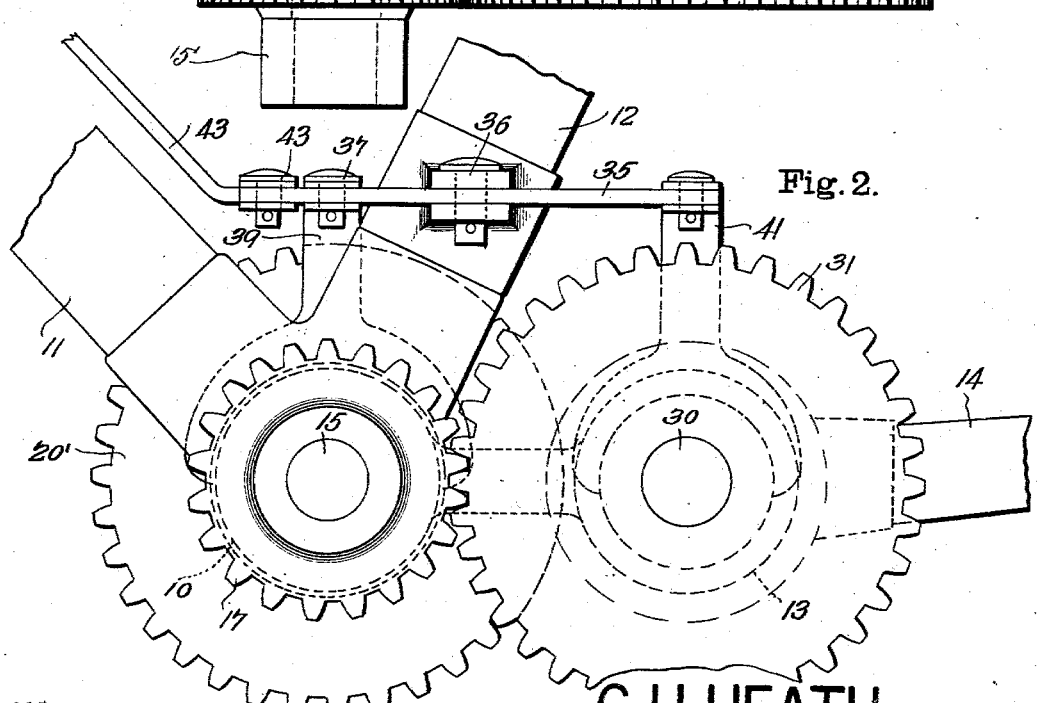

In the drawings forming a portion of this specification, and in which like numerals of reference indicate similar parts in the several views, Figure 1 is a plan view of the mechanism as applied to the frame of a bicycle, a portion of said frame being broken away to more clearly show the structure. Fig. 2 is a side elevation of the structure shown in Fig. 1. Fig. 3 is a side elevation showing a portion of the bicycle-frame and the means for throwing the clutch and shiftable gear. Fig. 4 is a view showing the clutch mechanism between the sprocket and the gear mounted loosely upon the crank-axle. Fig. 5 is a section through the loose crank-axle gear and showing the clutch for holding it to the shaft and the clutch for holding the sprocket thereto.

Referring now to the drawings, the bicycle-frame to which this mechanism is applied includes a crank-hanger 10 or bearing-sleeve of common form and to which are connected the bottom bar 11 and the seat-tube 12, and in the rear of this sleeve 10 is a second sleeve 13, which is parallel therewith and from which extend rearwardly and divergingly the tie-rods 14.

In the sleeve 10 is rotatably mounted a crank-axle 15, provided at its ends with cranks 15' and 16, and between the crank 15' and the adjacent end of the sleeve there is disposed a pinion 17, which is fixed to the axle or shaft 15.

On the shaft 15 and between the crank 16 and the adjacent end of the sleeve 10 there is loosely disposed a gear having recesses 18 in its inner face, and which recesses are adapted for engagement by pins 19 upon a clutch-disk 20, which is splined upon the shaft 15 for movement longitudinally thereof. When the clutch-disk is shifted to engage its pins with the gear, said gear is locked to rotate with the shaft, and when the pins are disengaged from the recesses the gear may rotate independently of the shaft.

In the hub 22 of the gear 20' referred to, and which extends outwardly from said gear, there are disposed radially-movable pins 23 in radial recesses, and these pins are held normally and yieldably outwardly by means of helical springs 24, disposed in the bottoms of the recesses and against which the pins are seated. A sprocket-wheel 25 is disposed for its hub 26 to encircle the hub of the gear and has eccentric arcuate slots or recesses in the inner face thereof, into which the pins engage to hold the sprocket against rotation in one direction, while permitting free rotation in an opposite direction, the free rotation being the forward movement thereof. Thus when the clutch is operated to engage its pins with the gear 20' rotation of the crank axle or shaft will effect forward rotation of the sprocket to propel the bicycle. If, however, the crank-shaft be held against movement, as in coasting, the bicycle may move ahead, the sprocket turning freely of the shaft. When the gear 20' is clutched to the shaft 15, the sprocket may be turned with and at the same speed as the shaft, and at this time the maximum speed is given to the bicycle. When a hill is to be climbed, a lower gear is of course desirable, and for this purpose a counter-shaft 30 is mounted in the sleeve 13, and at one end thereof is fixed a gear 31 in constant engagement with the pinion 17, and at the opposite end of the counter-shaft is splined a gear or pinion 32, adapted for sliding movement into and out of engagement with the gear 20'. The gear 31 is of greater diameter than pinion 17, and pinion 32 is of lesser diameter than gear 20'; so that if the several pinions and gears be in mesh and the clutch be in its inoperative position rotation of the crank-shaft will effect a rotation of the gear 20' and therewith of the sprocket at a speed greatly reduced from that of the crank-shaft.

In order that the clutch may be moved into operative position simultaneously with the movement of pinion 32 out of engagement with the gear 20', a rocker 35 is pivoted to a bracket 36 on the seat-tube of the bicycle-frame, and one end of this rocker has a link 37 pivoted thereto, while at the opposite end is pivoted a link 38. The link 37 is pivoted at its opposite end to the shank of a strap 39, engaged with a peripheral groove 40 in the hub of the clutch-disk, while the link 38 is pivoted to the shank of a strap 41, which is engaged with a peripheral groove in the hub 42 of the pinion 32. The rocker when operated moves the clutch into and the pinion out of operative position, and vice versa. To actuate the rocker, a lever 43 is pivoted on the bottom bar of the bicycle-frame and its lower end is pivoted to the rocker, while at the upper end thereof is pivoted a hand-lever 44, which is fulcrumed to a stud 45 on the head 46 of the bicycle-frame. This hand-lever extends above the top bar 47 of the frame and is adapted for engagement with a rack 48 to hold it at different limits of its movement to hold the gearing in either of its operative positions.

It will be understood that in practice the specific construction shown may be modified and that any suitable materials and proportions may be used for the various parts without departing from the spirit of the invention. Furthermore, it will be noted that while the present mechanism is shown as applied specifically to a bicycle it may be used in connection with a motor-vehicle of any type or in any other sphere to which it is applicable.

What is claimed is—

1. In a device of the class described, the combination with a crank-shaft, a gear mounted loosely thereon and a second gear fixed thereto, of a sprocket carried by the loose gear, a clutch for connecting the loose gear with the shaft, a counter-shaft, a fixed gear engaged with the fixed gear of the crank-shaft, a second gear splined to the counter-shaft for movement into and out of engagement with the loose gear of the crank-shaft, and a rocker connected with the clutch and splined gear for moving them alternately into operative positions.

2. In a device of the class described, the combination with a drive-shaft, a gear mounted loosely thereon and a second gear fixed thereto, of a clutch for clutching the loose gear to rotate with the shaft, a sprocket upon the loose gear, a clutch between the loose gear and sprocket and adapted to permit of movement of the sprocket in one direction independently of the shaft, a counter-shaft, a fixed gear engaged with the fixed gear of the drive-shaft, a second gear mounted for rotation by the counter-shaft and movable into and out of engagement with the loose gear upon the drive-shaft, a rocker connected with the clutch and the shiftable gear for moving them alternately into operative positions, and means for operating the rocker.

In testimony that I claim the foregoing as my own I have hereto affixed my signature in the presence of two witnesses.

CHARLES H. HEATH.

Witnesses:
EDWARD F. PAIGE,
FRANK H. DANIELL.